(12) United States Patent
Anzini et al.

(10) Patent No.: US 9,260,225 B2
(45) Date of Patent: Feb. 16, 2016

(54) ZIPPER PROFILE MANUFACTURED BY CUT AND STRETCH METHODS

(75) Inventors: David Anzini, Middletown, NY (US); Rusty Koenigkramer, Nanuet, NY (US); Eric Plourde, Frankfort, IL (US); Kenny McCracken, Dacula, GA (US); Steven Ausnit, New York, NY (US); Charles G. Greco, Bardonia, NY (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 380 days.

(21) Appl. No.: 13/306,448

(22) Filed: Nov. 29, 2011

(65) Prior Publication Data

US 2012/0301056 A1  Nov. 29, 2012

Related U.S. Application Data

(60) Provisional application No. 61/417,655, filed on Nov. 29, 2010, provisional application No. 61/417,675, filed on Nov. 29, 2010, provisional application No. 61/417,535, filed on Nov. 29, 2010, provisional (Continued)

(51) Int. Cl.
*B65D 33/24* (2006.01)
*B65D 33/25* (2006.01)
*B29D 5/10* (2006.01)

(52) U.S. Cl.
CPC ............... *B65D 33/255* (2013.01); *B29D 5/10* (2013.01); *B65D 33/2558* (2013.01)

(58) Field of Classification Search
CPC ..................... B65B 61/188; B31B 2219/9016; B29D 5/10; B29C 55/00; B65D 33/2558; B65D 33/255; B65D 2203/12
USPC ....... 24/400, 401, 402, 399, 30.5 R; 264/145; 383/63, 64
See application file for complete search history.

(56) References Cited

U.S. PATENT DOCUMENTS

| | | | | |
|---|---|---|---|---|
| 4,056,593 | A | | 11/1977 | de Navas Albareda |
| 4,189,809 | A | | 2/1980 | Sotos |
| 4,736,496 | A | * | 4/1988 | Fisher et al. ............... 24/585.12 |
| 5,070,584 | A | * | 12/1991 | Dais et al. ................. 24/585.12 |
| 5,140,727 | A | * | 8/1992 | Dais et al. ................. 24/585.12 |
| 5,307,552 | A | * | 5/1994 | Dais et al. ........................ 29/453 |
| 5,398,387 | A | * | 3/1995 | Torigoe et al. ................. 24/452 |
| 5,403,094 | A | * | 4/1995 | Tomic .............................. 383/63 |

(Continued)

FOREIGN PATENT DOCUMENTS

| | | |
|---|---|---|
| EP | 0 647 415 A1 | 4/1995 |
| EP | 1 138 220 A2 | 10/2001 |

(Continued)

OTHER PUBLICATIONS

International Search Report in PCT/US2011/062397 on Mar. 8, 2012.

*Primary Examiner* — Robert J Sandy
*Assistant Examiner* — Rowland Do
(74) *Attorney, Agent, or Firm* — McCarter & English, LLP

(57) ABSTRACT

The disclosure relates to a zipper for a reclosable bag wherein the zipper is designed to make additional sound during operation, and further provide an increased tactile response. The zipper profile is manufactured by forming cuts in the profile, and then the profile is stretched so that the cuts become gaps. These gaps cause additional sound during operation of the zipper.

27 Claims, 13 Drawing Sheets

Related U.S. Application Data application No. 61/444,217, filed on Feb. 18, 2011, provisional application No. 61/484,956, filed on May 11, 2011, provisional application No. 61/484,958, filed on May 11, 2011, provisional application No. 61/484,959, filed on May 11, 2011, provisional application No. 61/484,961, filed on May 11, 2011, provisional application No. 61/484,964, filed on May 11, 2011, provisional application No. 61/484,965, filed on May 11, 2011, provisional application No. 61/484,967, filed on May 11, 2011, provisional application No. 61/484,970, filed on May 11, 2011, provisional application No. 61/484,972, filed on May 11, 2011, provisional application No. 61/484,975, filed on May 11, 2011, provisional application No. 61/484,978, filed on May 11, 2011, provisional application No. 61/484,979, filed on May 11, 2011, provisional application No. 61/484,984, filed on May 11, 2011, provisional application No. 61/515,104, filed on Aug. 4, 2011.

(56) References Cited

U.S. PATENT DOCUMENTS

| | | | | |
|---|---|---|---|---|
| 5,470,518 A * | 11/1995 | Dais et al. | | 264/145 |
| 5,478,228 A | 12/1995 | Dais et al. | | |
| 5,647,100 A | 7/1997 | Porchia et al. | | |
| 5,713,111 A * | 2/1998 | Hattori et al. | | 24/452 |
| 5,722,128 A * | 3/1998 | Toney et al. | | 24/400 |
| 5,878,468 A | 3/1999 | Tomic et al. | | 24/585.12 |
| 5,901,625 A * | 5/1999 | May | | 83/338 |
| 5,934,806 A * | 8/1999 | Tomic et al. | | 383/63 |
| 5,962,040 A | 10/1999 | Dais et al. | | |
| 6,021,557 A * | 2/2000 | Dais et al. | | 29/453 |
| 6,082,897 A | 7/2000 | Galomb | | |
| 6,217,215 B1 * | 4/2001 | Tomic | | 383/63 |
| 6,299,353 B1 | 10/2001 | Piechocki | | |
| 6,367,128 B1 * | 4/2002 | Galkiewicz et al. | | 24/585.1 |
| 6,594,872 B2 * | 7/2003 | Cisek | | 24/401 |
| 6,692,147 B2 * | 2/2004 | Nelson | | 383/63 |
| 6,786,712 B2 * | 9/2004 | Cisek | | 425/321 |
| 6,953,542 B2 * | 10/2005 | Cisek | | 264/210.2 |
| 7,270,479 B2 * | 9/2007 | Nelson | | 383/63 |
| 7,850,368 B2 * | 12/2010 | Pawloski et al. | | 383/61.2 |
| 8,469,593 B2 * | 6/2013 | Price et al. | | 383/63 |
| 8,568,031 B2 * | 10/2013 | Price et al. | | 383/63 |
| 2003/0066267 A1 * | 4/2003 | Nelson | | 53/412 |
| 2003/0177619 A1 * | 9/2003 | Cisek | | 24/585.12 |
| 2004/0234173 A1 * | 11/2004 | Saad | B29C 47/0021 | 383/63 |
| 2006/0008184 A1 * | 1/2006 | Borchardt et al. | | 383/63 |
| 2010/0135600 A1 | 6/2010 | Ducauchuis et al. | | |
| 2012/0027322 A1 * | 2/2012 | Ackerman | A44B 19/16 | 383/64 |
| 2012/0106874 A1 * | 5/2012 | Pawloski | | 383/63 |
| 2012/0106875 A1 * | 5/2012 | Pawloski | | 383/64 |
| 2012/0106876 A1 * | 5/2012 | Pawloski | | 383/97 |
| 2012/0213454 A1 * | 8/2012 | Price | B65D 33/255 | 383/63 |
| 2013/0207311 A1 * | 8/2013 | Plourde | B65D 33/255 | 264/299 |
| 2015/0158637 A1 * | 6/2015 | Kosub, Sr. | B65D 33/255 | 24/415 |

FOREIGN PATENT DOCUMENTS

| | | |
|---|---|---|
| JP | 2011-001084 | 1/2001 |
| JP | 2010-120190 | 6/2010 |
| WO | 94/09279 A1 | 4/1994 |

* cited by examiner

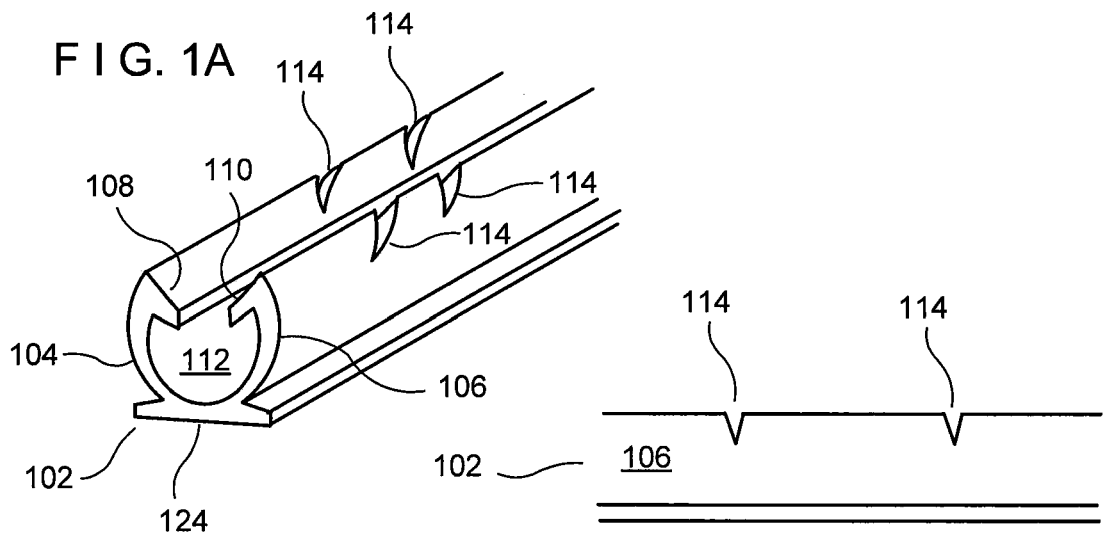
FIG. 1A
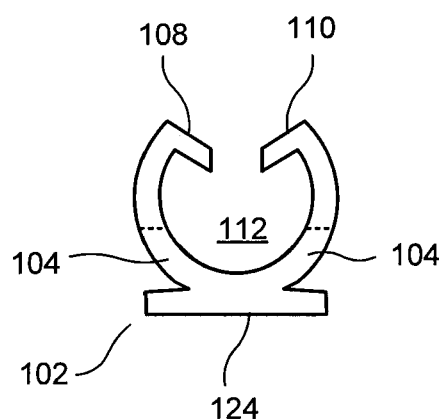
FIG. 1C
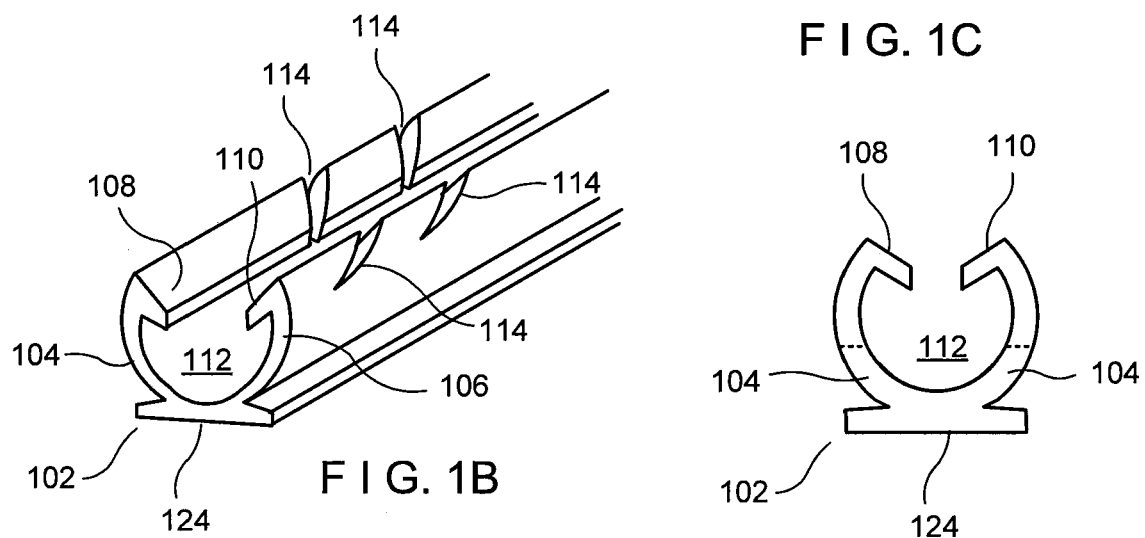
FIG. 1B
FIG. 2A
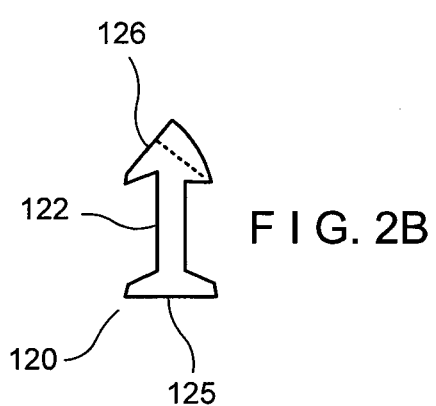
FIG. 2B
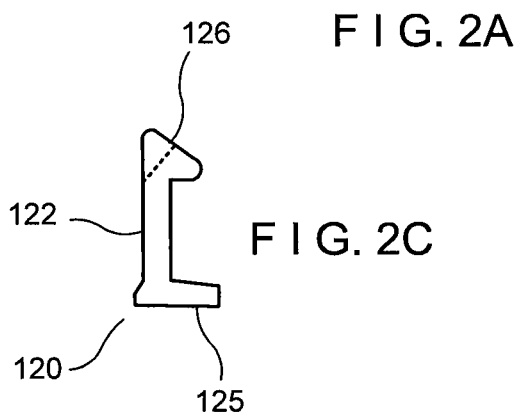
FIG. 2C

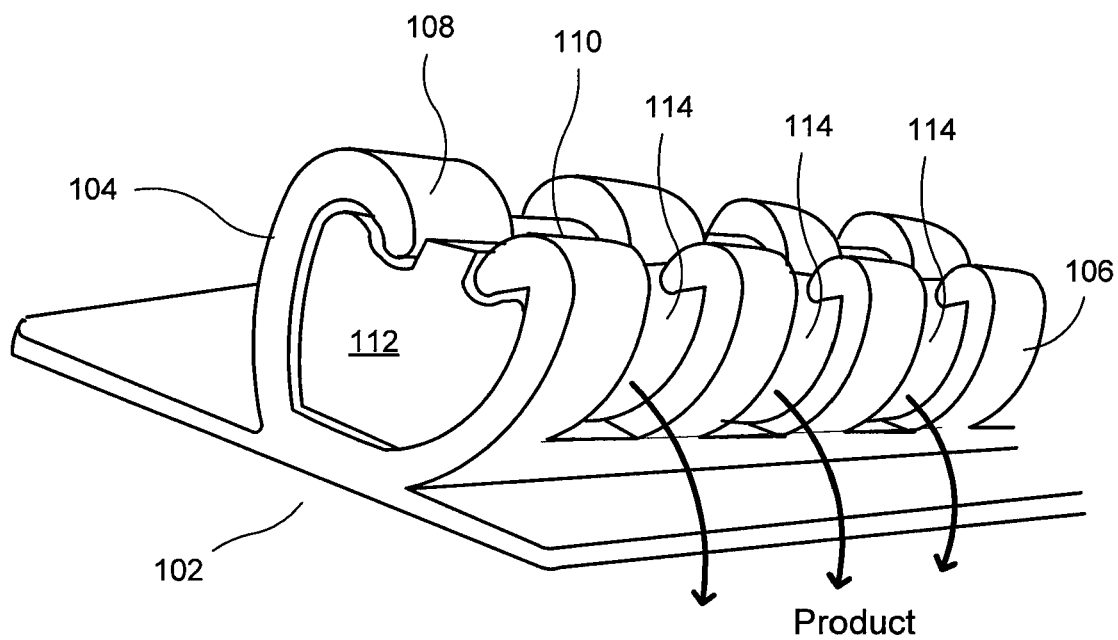
F I G. 14

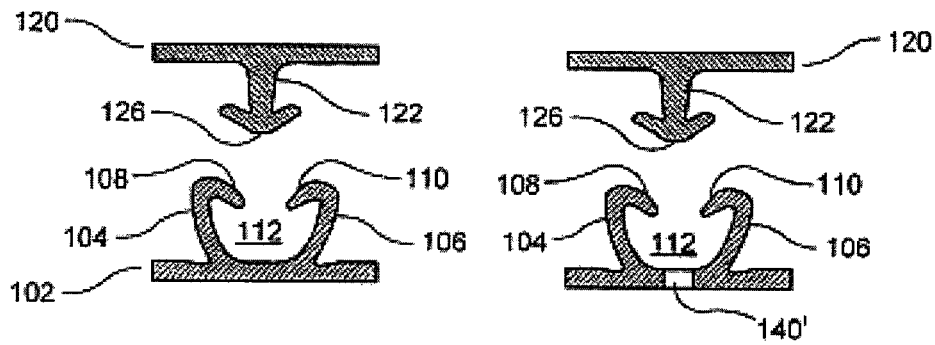
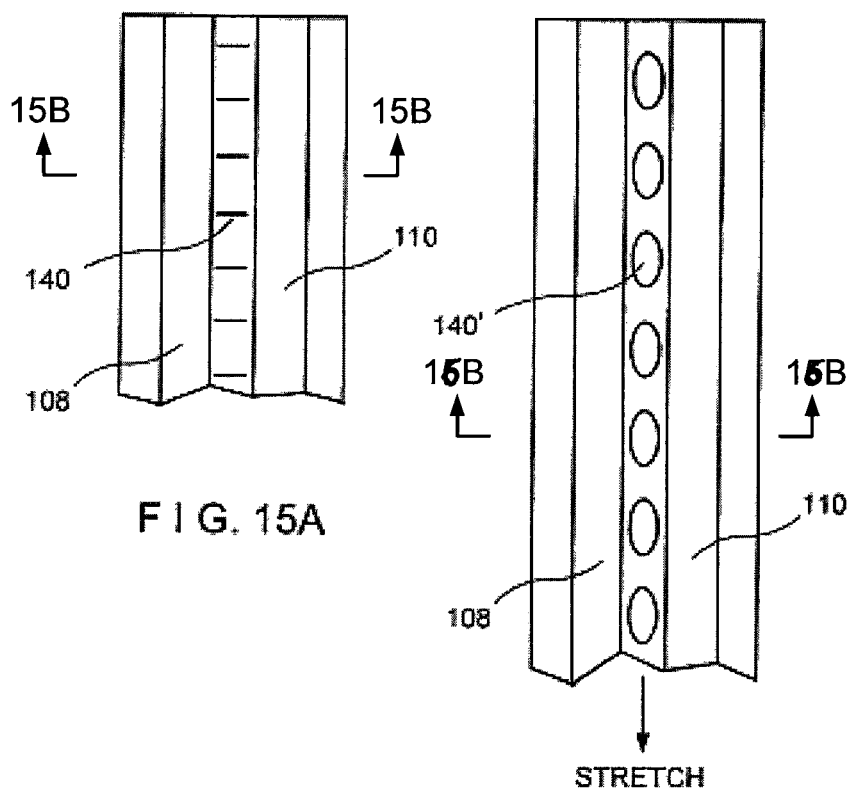

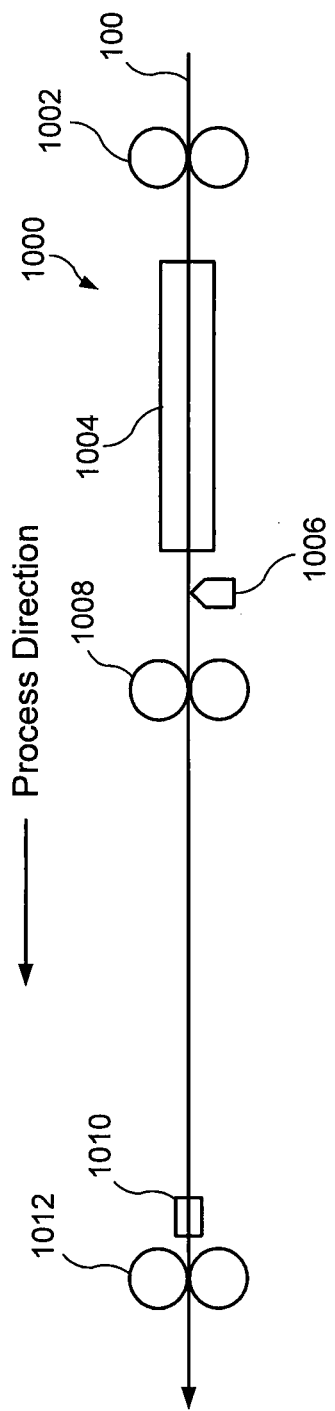
F I G. 18

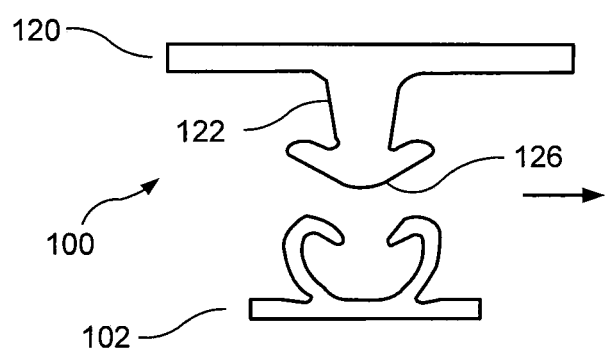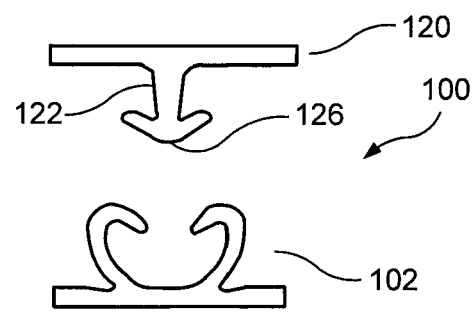
FIG. 19A          FIG. 19B
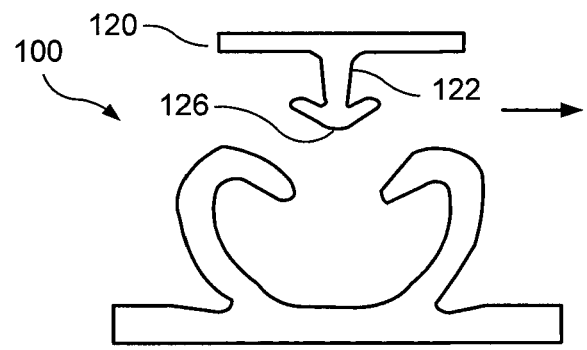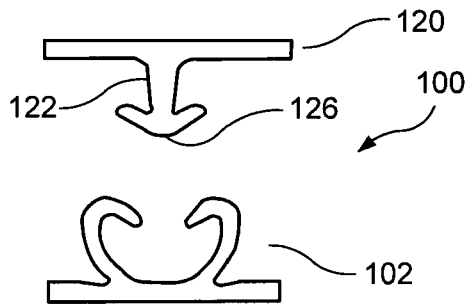
FIG. 20A          FIG. 20B

ZIPPER PROFILE MANUFACTURED BY CUT AND STRETCH METHODS

This application claims priority under 35 U.S.C. §119(e) of the following provisional patent applications, the contents of all of which are hereby incorporated by reference, in their entirety:
1. provisional application Ser. No. 61/417,655, filed on Nov. 29, 2010;
2. provisional application Ser. No. 61/417,675, filed on Nov. 29, 2010;
3. provisional application Ser. No. 61/417,535, filed on Nov. 29, 2010;
4. provisional application Ser. No. 61/444,217, filed on Feb. 18, 2011;
5. provisional application Ser. No. 61/484,956, filed on May 11, 2011;
6. provisional application Ser. No. 61/484,958, filed on May 11, 2011;
7. provisional application Ser. No. 61/484,959, filed on May 11, 2011;
8. provisional application Ser. No. 61/484,961, filed on May 11, 2011;
9. provisional application Ser. No. 61/484,964, filed on May 11, 2011;
10. provisional application Ser. No. 61/484,965, filed on May 11, 2011;
11. provisional application Ser. No. 61/484,967, filed on May 11, 2011;
12. provisional application Ser. No. 61/484,970, filed on May 11, 2011;
13. provisional application Ser. No. 61/484,972, filed on May 11, 2011;
14. provisional application Ser. No. 61/484,975, filed on May 11, 2011;
15. provisional application Ser. No. 61/484,978, filed on May 11, 2011;
16. provisional application Ser. No. 61/484,979, filed on May 11, 2011;
17. provisional application Ser. No. 61/484,984, filed on May 11, 2011; and
18. provisional application Ser. No. 61/515,104, filed on Aug. 4, 2011.

BACKGROUND OF THE DISCLOSURE

1. Field of the Disclosure

The present disclosure relates to a zipper structure for a reclosable package wherein at least one of the zipper profiles, typically including the female profile, is partially cut or excised, and then stretched, typically in order to obtain audible clicking sounds and a tactile feel during subsequent consumer operation.

2. Description of the Prior Art

In the prior art, it is known to deform zipper profiles. Examples of such deformed zipper profiles are disclosed in U.S. Pat. No. 4,189,809 entitled "Fastener Device and Method of Manufacturing", issued on Feb. 26, 1980 to Sotos and U.S. Pat. No. 4,056,593 entitled "Method of Making a Fastener", issued on Nov. 1, 1977 to de Navas Albareda. Additional prior art includes U.S. Pat. No. 6,299,353, entitled "Zipper for Reclosable Container with Apertures Passing Through Female Profile, issued to Piechocki on Oct. 9, 2001; U.S. Pat. No. 5,962,040 entitled "Apparatus for Making a Zipper for a Reclosable Thermoplastic Bag", issued on Oct. 5, 1999 to Dais et al.; U.S. Pat. No. 5,647,100 entitled "Closure Member for a Reclosable Thermoplastic Bag" issued on Jul. 15, 1997 to Porchia et al.; U.S. Pat. No. 5,478,228, entitled "Apparatus for Making a Zipper for a Reclosable Thermoplastic Bag", issued on Dec. 26, 1995 to Dais et al, and U.S. Patent Publication 2010/135600, entitled "Automatic Gripping Device with Extremely Flexible Hooks", published on Jun. 3, 2010.

However, further improvements are sought with respect to the quality of the audible clicking sound and tactile feel when the zipper is opened and closed.

Additionally, further improvements are sought with regard to maintaining the strength of the closure of the resulting zipper (i.e., the balloon effect), particularly with respect to the seepage through the closed zipper when the zipper bag is filled with air. Similarly, further improvements are sought with regard to the production rates and manufacturing costs.

SUMMARY AND OBJECTS OF THE DISCLOSURE

It is therefore an object of the present disclosure to provide further improvements in a zipper for a reclosable package, wherein a superior quality of the audible clicking sound and the tactile feel are achieved during opening and closing of the zipper.

It is therefore a further object of the present disclosure to provide such a zipper which maintains its closure strength. In particular, this strength should ideally be maintained when the zipper is filled with air, so that there is no more, or even less, seepage than would occur in a prior art zipper.

It is therefore a still further object of the present disclosure to maintain or increase the production speeds of the zipper, while maintaining or decreasing the production costs of the zipper.

BRIEF DESCRIPTION OF THE DRAWINGS

Further objects and advantages of the disclosure will become apparent from the following description and from the accompanying drawings, wherein:

FIG. 1A is a perspective view of a female element of a zipper profile of an embodiment of the present disclosure, including perpendicularly-oriented cuts.

FIG. 1B is a perspective view of a female element of a zipper profile of an embodiment of the present disclosure, including inclined cuts.

FIG. 1C is a side view of a female element of a zipper profile of an embodiment of the present disclosure, illustrating both the perpendicular-oriented cut and the inclined cut.

FIG. 2A is a cross-sectional view of a female element of an embodiment of a zipper profile of the present disclosure, illustrating a preferred depth of cut into the female profile.

FIG. 2B is a cross-sectional view of a two-pronged male element of an embodiment of the zipper profile of the present disclosure illustrating the preferred depth of cut into the male profile.

FIG. 2C is a cross-sectional view of a single pronged male element showing an alternative cut in the male profile.

FIG. 14 illustrates an embodiment of the present disclosure, particularly for use with a powder product.

FIG. 15A is a plan view of an embodiment of the present disclosure, prior to stretching.

FIG. 15B is a cross-sectional view along plane 15B-15B of FIG. 15A, further including a male profile.

FIG. 16A is a plan view of an embodiment of the present disclosure, after stretching.

FIG. 16B is a cross-sectional view along plane 16B-16B of FIG. 16A, further including a male profile.

FIG. 18 is a schematic of an apparatus and method used for stretching zipper in the present disclosure.

FIG. 19A is a cross-sectional view illustrating the proportions of the zipper profiles prior to stretching of the male profile.

FIG. 19B is a cross-sectional view illustrating the proportions of the zipper profiles after stretching of the male profile.

FIG. 20A is a cross-sectional view illustrating the proportions of the zipper profiles prior to stretching of the female profile.

FIG. 20B is a cross-sectional view illustrating the proportions of the zipper profiles after stretching of the female profile.

DETAILED DESCRIPTION OF THE PREFERRED EMBODIMENTS

Figure 3:
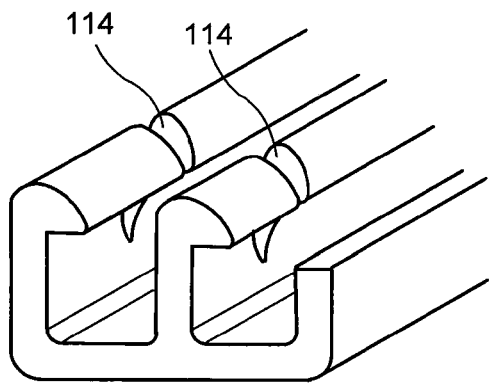
FIG. 3 is a perspective view of a further embodiment of a zipper profile of the present disclosure.

Referring now to the drawings in detail wherein like numerals indicate like elements throughout the several views, one sees that FIGS. 1A, 1B and 1C illustrate female zipper profile 102 of a zipper 100. At the outset, zipper 100 is typically made of polymeric material, such as, but not limited to, high density polyethylene, medium density polyethylene, low density polyethylene, linear low density polyethylene, polypropylene, cyclic olefin copolymers, ultralow density polyethylene, very low density polyethylene, elastomers, plastomers, metallocene linear low density polyethylene, metallocene polypropylene, or mixtures thereof, and parts of the zipper, such as the hooks or arms, may be made of one material while the rest of the zipper is made from a different material. Female zipper profile 102 includes first and second upwardly extending arms 104, 106, terminating in respective first and second detent hooks 108, 110, and thereby creating a female space 112 therebetween. Additionally, upwardly extending arms 104, 106 include a series of partial cuts 114. As illustrated in FIG. 1A and the left side of FIG. 1C, these cuts can be formed perpendicularly or at an angle to a longitudinal axis of female zipper profile 102. In a typical application, it is envisioned that the depth of partial cuts 114 would be from ten to sixty percent of the height of the female zipper profile 102, as illustrated in FIG. 2a. However, in some embodiments, such as, but not limited to double zippers wherein only a single zipper is cut, the depth of the partial cuts may be as much as eighty percent of the height of the female zipper profile 102. It is a concern that further cutting may result in loss of strength, ballooning or distortion after the subsequent stretching step. The extent of the stretching step is typically, but not limited to, ten to forty percent of the length of the zipper material being stretched. This extent of stretching refers to the extent of the initial stretching and does not include any possible subsequent elastic retraction of the zipper after the stretching step has terminated. The female zipper profile 102 is combined with a male zipper profile 120 of FIG. 2B, typically comprising a post element 122 arising from a base or flange 125 and termination in arrowhead-shaped detent head 126 which, in the engaged position, is engaged by first and second detent hooks 108, 110 of female zipper profile 102 (which also may be cut).

Typical dimensions for partial cuts 114 would be a cut and stretched gap width of 0.030 to 0.090 inches and a stretched gap distance center-to-center of 0.1875 to 0.3125 inches, but those skilled in the art may realize, after review of the present disclosure, that other spacing may be appropriate for different applications. For instance, when only one zipper of a double zipper profile is cut, the cut and stretched gap could typically have a width from 0.030 to 0.18 inches.

Figure 4:
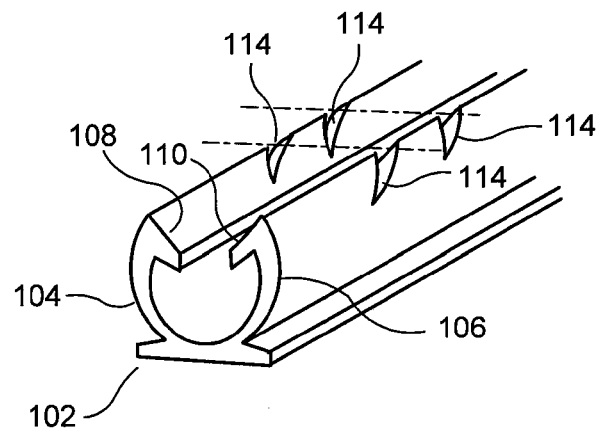
FIG. 4 is a perspective view of a female element of a further embodiment of a zipper profile of the present disclosure.
Figure 5:
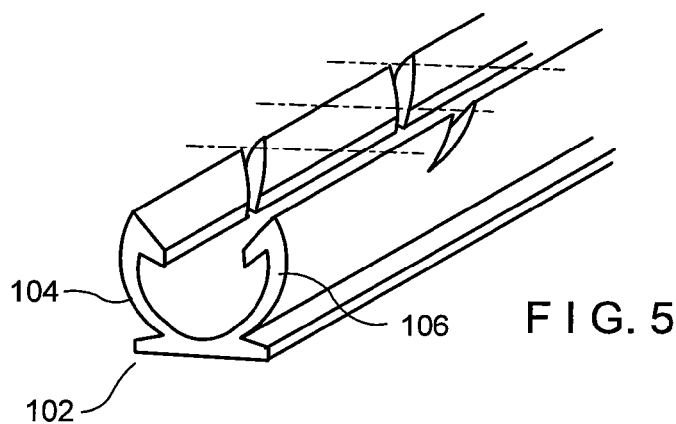
FIG. 5 is a perspective view of a female element of a still further embodiment of a zipper profile of the present disclosure.
Figure 6A:
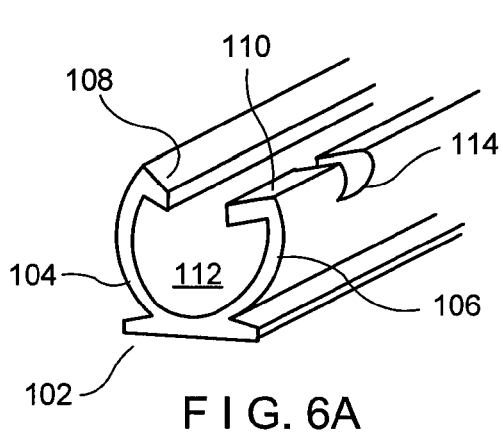
FIGS. 6A and 6B are perspective and top views, respectively, of a female element of a still further embodiment of a zipper profile of the present disclosure.
Figure 6B:
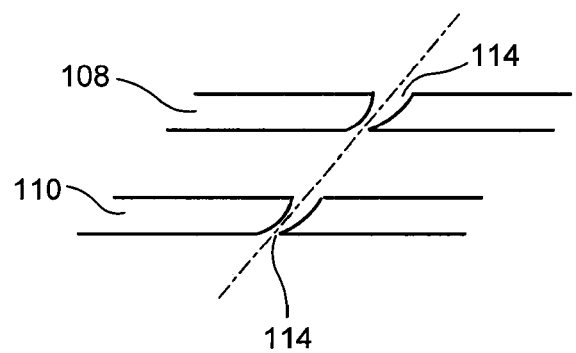
Figure 7A:
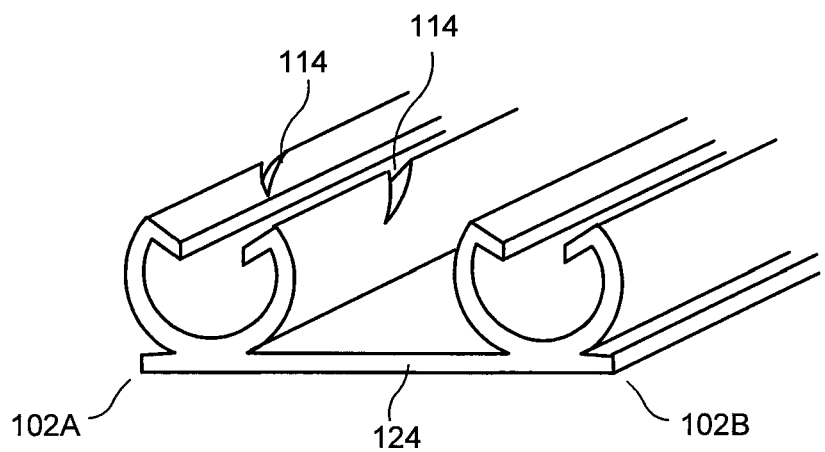
FIGS. 7A, 7B, 7C, 7D, 8 and 9 are perspective views of embodiments of double zipper and/or multiple male arrangements of the present disclosure.
Figure 7B:
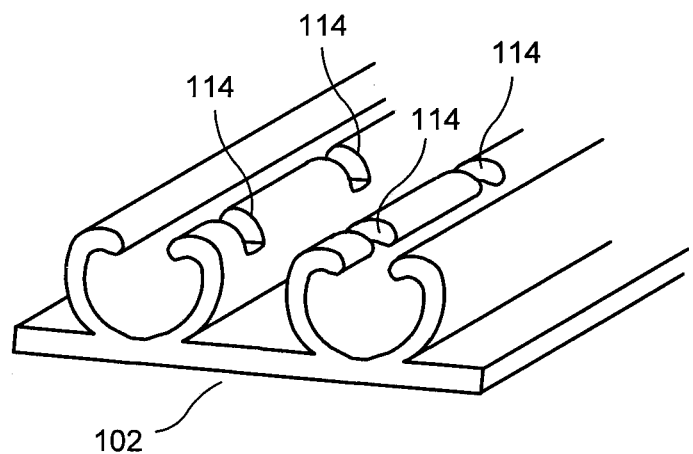
Figure 7C:
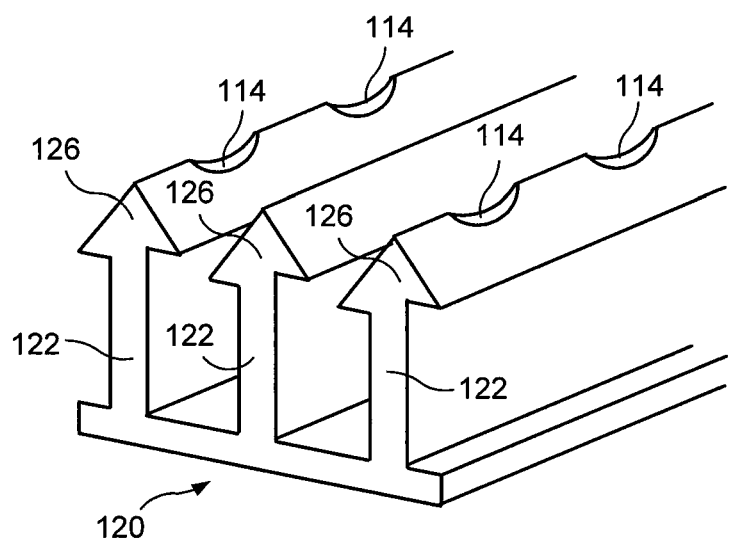
Figure 7D:
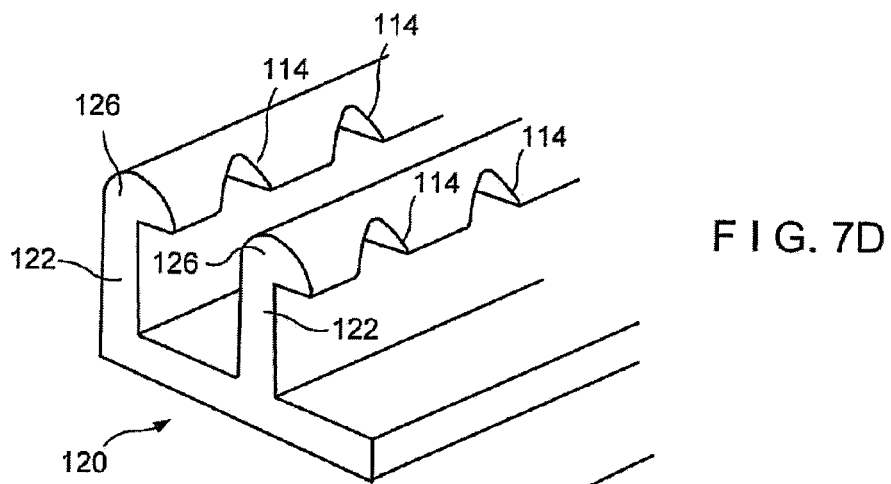
Figure 8:
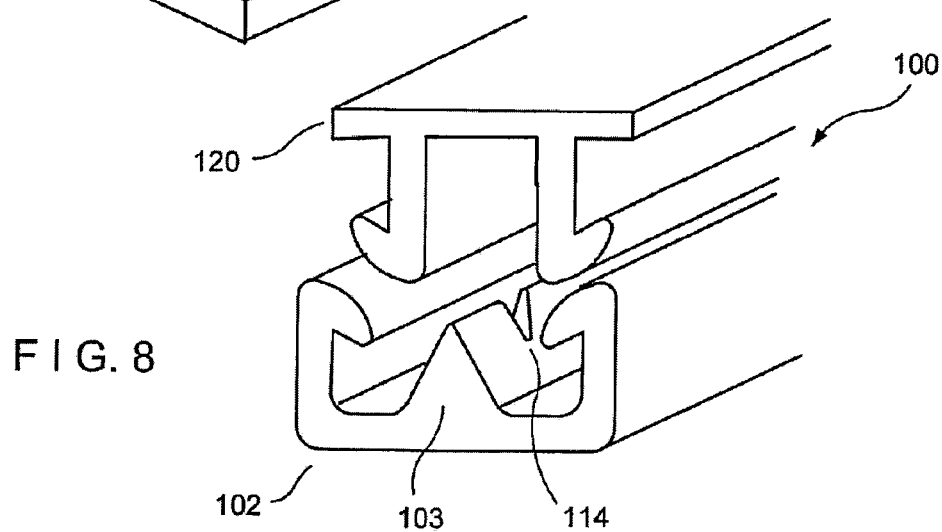
Figure 9:
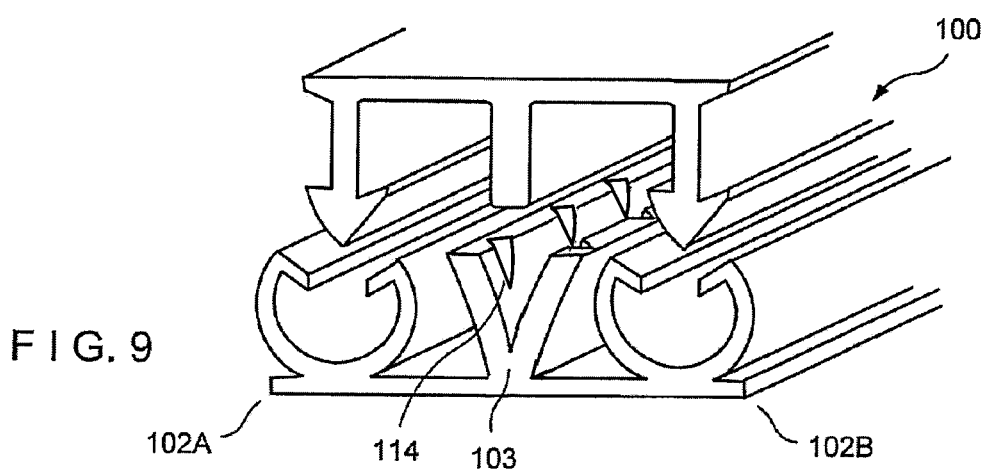

When the zipper 100 is subsequently stretched, the partial cuts 114 become gaps that provide improved audible and tactile features, without losing advantages of prior art zippers. After the partial cuts 114 are made, the zipper 100 is heated and then stretched. As stated above, the depth of the partial cut 114 is typically ten to sixty percent of the height of the female or male zipper profile, although some embodiments may have cuts as deep as eighty percent of the height of the female zipper profile (particularly if only one zipper profile of a double zipper profile is cut). The partial cuts 114 can be made after the zipper 100 has been extruded and cooled, or in some cases, while the zipper 100 is still warm from extrusion. Additionally, some embodiments may include an additional series of steps of heating, stretching and cooling after the initial steps of cutting, stretching, and cooling. Alternately, the pre-extruded zipper 100 may be fed from a spool. The partial cuts 114 can be made by a blade, a laser, an ultrasonic, or other similar apparatus. The partial cuts 114 can be made in only the female zipper profile 102, only the male zipper profile 120, or in both the male and female zipper profile 102, 120. Additionally, the partial cuts 114 can be made in multiple profile zippers 100 such as shown in FIGS. 3, 7A-D, 8 and 9. Furthermore, the double zipper constructions or double zippers with central sections, as shown in FIGS. 7A-7D, 8 and 9 can provide various combinations of the disclosed cut-and-stretch configurations in that a first zipper component 102A of the double zipper can have the cut-and-stretch configuration while the second zipper component 102B of the double zipper can be free of the cut-and-stretch configuration (in this configuration, a depth of the partial cuts 114 can be as much as eighty percent of the height of the profile). Part of the zipper 100 can have partial cuts 114, or central sections 103 of the zipper 100 can have partial cuts 114. In all cases, it is envisioned that the partial cuts 114 would become gaps after the stretching step occurs. Depending upon the depth of the partial cuts 114, the typical percentage initial elongation involved in the stretching of the zipper can be from ten to as much as forty percent on a length-wise basis (prior to any possible subsequent elastic retraction after the stretching step has terminated). The female zipper profile 102 can be partially cut on one or both sides, or only one or both arms 104, 106 can be cut, or any combination (see FIGS. 4 and 5). Similarly, the male zipper profile 120 or the single hook profiles can have one or even both hooks cut. The partial cuts 114 of the female zipper profile 102 can be opposite from each other or offset from each other. Alternatively, the partial cuts 114 can be made diagonally across the linear profiles (with respect to the longitudinal axis of the zipper 100 and the zipper profiles 102, 120) in one or more angles, and, for a female profile, either in one or both legs (see FIGS. 6A and 6B). Additionally, with respect to the stretching step, one profile may be stretched more than the other, or one profile may initially be longer than the other before stretching in order to compensate for differences in stretching. The resulting zipper maintains its strength as well as its leak-resistance (i.e., the ballooning effect). Moreover, the resulting zipper is resistant to deterioration and the interlocking elements are maintained in interlockable alignment.

In particular, laser cutting or transverse direction slitting of the profiles can be used. Two-dimensional laser scoring could slit or cut part of the legs of the female profile at different pitches in order to create a torturous, or at least non-linear, path without cutting the bottom section of the female profile. It is expected that the resulting zippers would continue to show acceptable ballooning properties in that there is still enough closure contact to impede the flow of air through the closure when the closure halves are mated. Similarly, the partial cuts could be created by scoring, with processing through a high tension treated section to stretch the zipper would create a gap through which particles could fall. The zipper could be stretched once, or even 2-10 times, typically from 10 to 40 percent on a length-wise basis. The zipper could be annealed with heat to equilibrate or relax the plastic and reduce camber, followed by a step of cooling the zipper with a second water bath or similar apparatus to set the shape before joining and spooling. In some applications, stretching may be omitted.

Low density polyethylene, as well as other similar materials, may be used in the embodiments shown in FIGS. 7A-D, 8 and 9 and other similar embodiments. However, in order to increase the sound or noise generated by the operation of the zippers, the tips of the profiles 102, 120 may be made from higher modulus resins. The noise is created by the flipping of the tips and connected arm or leg causing vibration which turns into sound. Replacing the resin with high modulus resin is expected to make the opening and closing operations noisier. A second or additional material, such as a high modulus resin, may be introduced into only the tips or hooks of the profile during manufacture. Alternately, larger portions or even the entire profile can be made of these materials. Non-exclusive examples of resins that will work to create more sound with standard polyethylene resins include medium density polyethylene, linear low density polyethylene, polypropylene and copolymers, higher order polyolefins, including, but not limited to polymethylpentene-like TPX resin and cyclic olefin copolymers like Topas resin, or any high density or high tensile modulus material or combinations thereof. It is noted the low density polyethylene typically has a 0.2 modulus, GPa whereas the listed material typically have a 0.8-2.6 modulus, GPa. Moreover, the zipper base or flange can be made from a different material or materials than the locking portion (i.e., legs) of the zipper.

Figure 10:
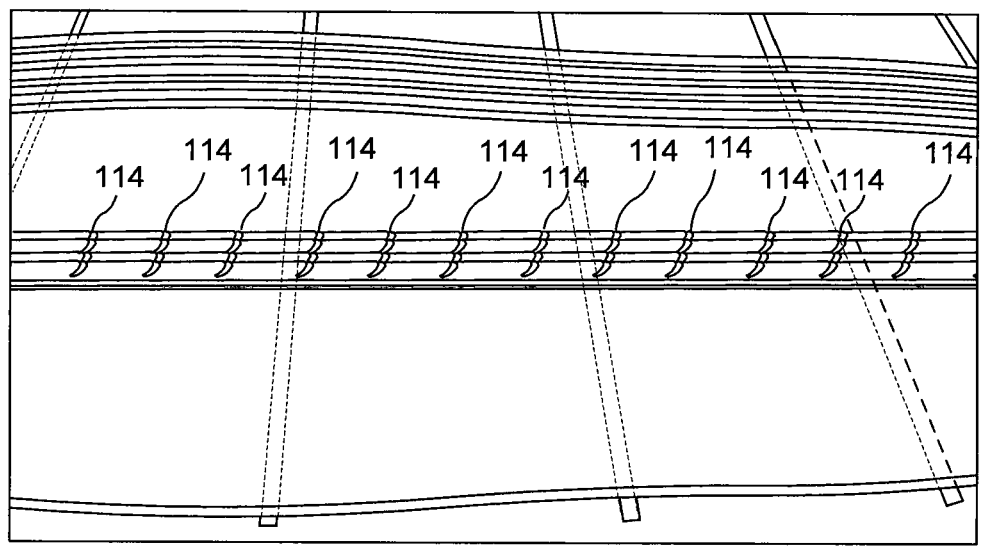
FIG. 10 is a perspective view of an embodiment of the present disclosure including a multiple alignment zipper.

Further embodiments are shown in FIG. 10 wherein a multi-alignable zipper profile 300 has partial cuts or notches 114 made in the transverse direction (with respect to a longitudinal axis of the zipper 100 and the zipper profiles 102, 120) straight across or on a bias by use of a high-speed serrated blade, oscillating circular blade, laser cut, or similar cutting device. A rotating wheel with blades that run parallel to the axis of rotation (with possible skewing of the blades from parallel to make a bias cut) may also be used. The partial cuts or notches 114 may be intermittently placed at a predetermined spacing so that, after stretching, the multi-alignable profile will cross track at the point when the serrated notch is reached thereby reducing the void created when cross tracking as well as providing a smoother feel when closing longer multi-alignable profiles.

Additionally, in lieu of laser or mechanical cutting device, the extrusion of the zipper profiles 102, 120 may be done so that the desired interlocking element breaks either randomly or at a specific periodic spacing. Similarly, additional steps of re-heating, cooling and re-stretching can cause a random or nearly random pattern of breakage. This breakage can be induced by the use of dissimilar polymers (i.e., low tensile strength in profile and high elasticity in web), the introduction of dissimilar materials extruded by metering two or more types of polymers that will cause a point of breakage when stretched in the weld line of zippers, brittle polymers, weakening agents, contaminants, foam agents or similar materials or compounds.

Figure 11:
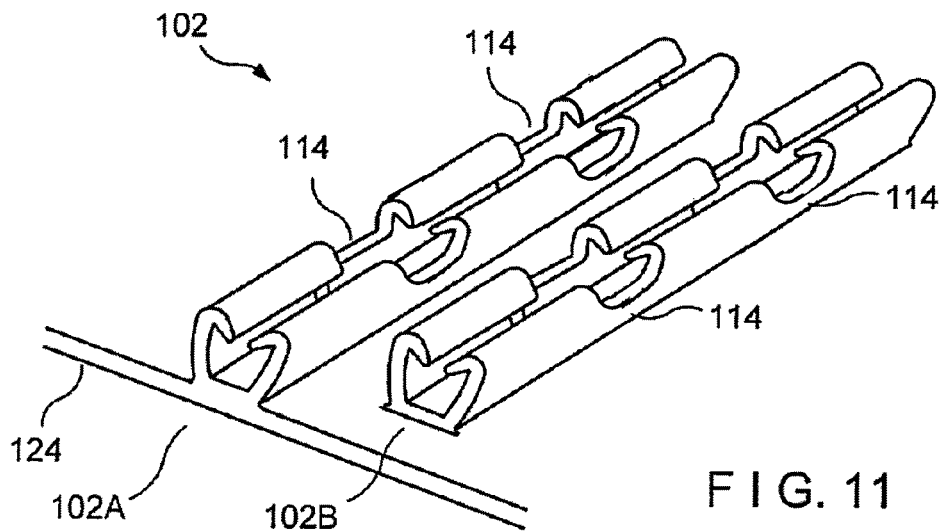
FIGS. 11 and 12 are perspective view of embodiments of the present disclosure including female profiles of a double zipper configuration.
Figure 12:
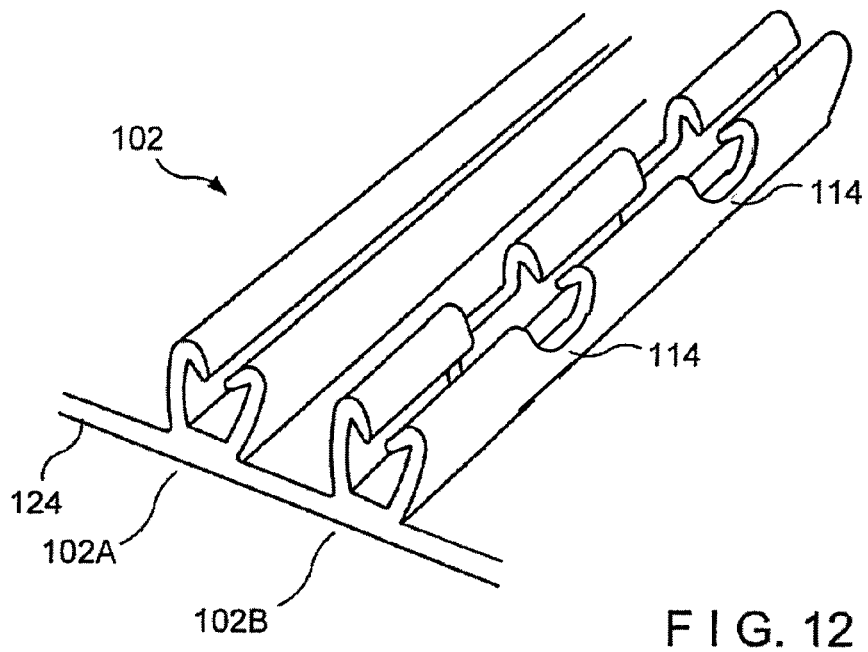

Further embodiments are shown in FIGS. 11 and 12. The disclosed female profiles 102 of a double zipper are formed first by the step of extrusion, followed by the step of stretched partial cuts 114 into the female profiles 102A and 102B. The partial cuts 114, which become gaps after the step of stretching, do not detract from the positive closing experience of the double profile, and creates an audible and tactile sensation when the package is re-opened by the consumer. In FIG. 11, the double zipper profile has been preferentially cut and stretched, thereby resulting in a zipper profile with one continuous female zipper profile 102A and one discontinuous female zipper profile 102B. This results in additional advantages of easy alignment of the double profile, tactile feedback by way ergonomic centerline spacing of the profiles and audible feedback when the package is opened. Additionally, the zipper in FIG. 11 will typically provide a closure that will demonstrate package ballooning, even after the first time opening of the package by the consumer.

The zipper thereby achieves easy closure in that the repeating format of a profile segment followed by a space allows zipper mis-alignments up to five degrees while maintaining closing ease in a press-to-close zipper. Depending upon profile shape, materials resulting cut and stretch strength, and other requirements of the specific application, the space and profile distances may be varied. Additionally, the opening and closing of the offset leg segments will vibrate thereby providing positive tactile and audio feedback to the consumer. This may even be accomplished by transverse direction laser scoring in the absence of subsequent stretching. Moreover, such zippers may be applicable for powder-resistant applications. Typically, the use of a zipper profile with a high contact area will maintain the ballooning effect. However, adjusting the degree of the ballooning characteristic via manipulation of the contact area will allow this zipper to self-vent in a microwave or similar application.

Figure 13:
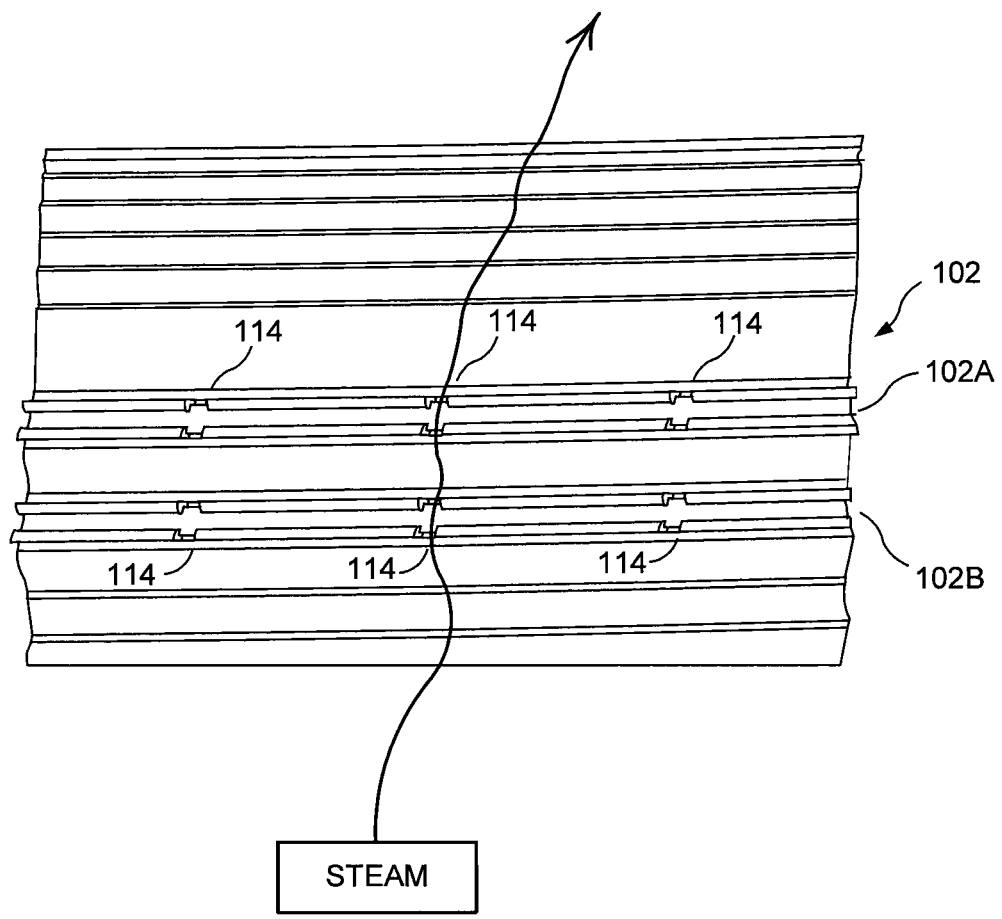
FIG. 13 illustrates the escape of steam, such as that generated subjecting the package to microwave energy, through the zipper profile.

FIG. 13 illustrates how partial cuts or gaps 114 can be placed in the transverse direction across the female zipper 102, optionally followed by a stretching step, in order to allow for evacuation of gas as a result of microwaving or other heating.

FIG. 14 is a perspective view of a female zipper profile 102 wherein the product side of the female zipper profile 102 as embodied by arm 106 includes the partial cuts 114, which have been transformed into gaps by a stretching while the arm 102 on the consumer side is left intact. This results in a powder-resistant zipper wherein powder product which may otherwise accumulate within the female zipper profile 102 and interfere with the proper sealing of the zipper will tend to fall through the partial cuts or gaps 114 back into the product area of the container without jamming the zipper or escaping from the package. Subsequent package handling may cause further powder product to pass through partial cuts or gaps 114 into the product container. Additionally, this configuration can be used to allow steam to escape during microwave or other heating. It should be noted that while the partial cuts 114 are deeper than the sixty or eighty percent of the height of the profile, the partial cuts are typically formed on only one side of the female zipper profile 102 in order to maintain the strength of the profile.

FIGS. 15A, 15B, 16A and 16B illustrate an embodiment of a powder-resistant zipper 100. FIG. 15A illustrates that slits 140 are cut into the web or base 124 of female profile 102. FIG. 16A illustrates that the female profile 102 is then stretched so that slits 140 are transformed into apertures 140'. Powder product can then pass through apertures 140'. This process is advantageous over the prior art of simply punching the apertures 140' in that typically little or no slugs or other plastic waste is formed by the formation of slits 140.

Figure 17A:
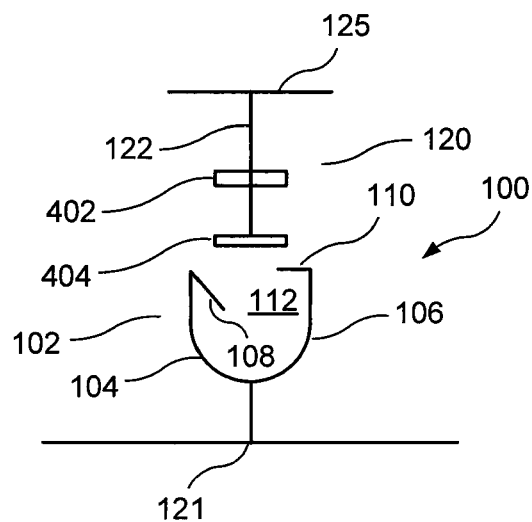
FIGS. 17A-17D illustrate further embodiments of the present disclosure, particularly adapted to increasing the sound production of the zippers during operation.
Figure 17B:
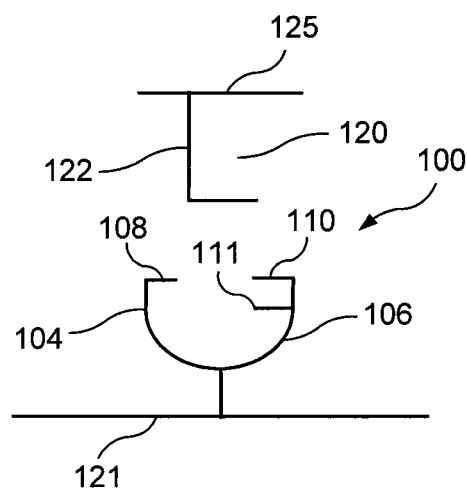
Figure 17C:
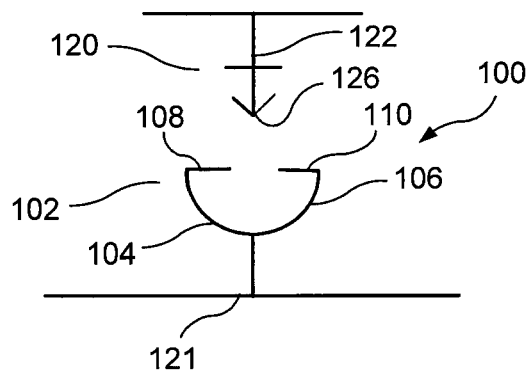
Figure 17D:
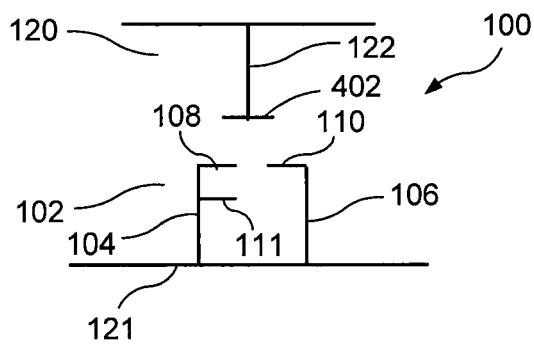

FIGS. 17A-17D illustrate cross-sectional views of zippers 100 wherein additional elements have been added to increase the sound production further during opening and closing operations of the zipper 100, such as by slapping, resonating and double clicking. In FIG. 17A illustrates a male profile 120 with post element 122 and two transverse elements 402, 404 parallel to each other, along with female profile 102 wherein hook 108 is downwardly obliquely oriented into space 112 while hook 110 is horizontally oriented. In FIG. 17B, male post element 122 is L-shaped, hooks 108, 110 are horizontal and lower hook element 111 is placed under second hook 110 in female element 102. In FIG. 17C, transverse element 402 is placed above the arrowhead-shaped detent head 126 on post element 122 of male profile 120. In FIG. 17D, male element 120 includes a single transverse element 402 on post element 122 and lower hook element 111 is placed under first hook 108 in the female profile 102.

FIG. 18 is a schematic of a process and apparatus 1000 used for the stretching of zipper 100. In particular, apparatus 1000 is intended to provide for heating and stretching of the zipper 100 to the desired elongation and to maintain tension during cooling. Pre-extruded and spooled zipper 100 is unwound through a first nip drive 1002 and passed through a hot air chamber or similar heating device 1004, and upon exiting therefrom, cooled by air knife 1006, typically fed by a venturi air cooler. Through combinations of temperature setting, nip speeds, and cooling placement, zipper 100 is stretched, typically with minimal or no profile deformation or web waviness. The zipper 100 is then passed into a second nip drive 1008, running at a higher speed than the first nip drive 1002 thereby causing stretching of the heated zipper 100. The zipper 100 is then passed under tension to a zipper profile joining core 1010 through a third nip drive 1012 which is separated from the second nip drive 1008.

While the zipper 100 is typically joined as it passed through the hot air chamber 1004, other embodiment may be implemented wherein zipper 100 is unjoined as it passes through the hot air chamber 1004 thereby allowing the profiles and the inside of the webs to heat more quickly. Furthermore, the cold air from air knife 1006 is applied to the outside of the webs only. This rapid cooling sets the webs by stopping their ability to yield. The profiles, however, remain hot and continue to elongate under tension created between the second and third nip drives 1008, 1012, under ambient conditions. When the profiles are rejoined (if necessary) at zipper profile joining core 1010, there is no deformation. Additional cooling may be added prior to the third nip drive 1012, in order to shorten the distance required for cooling, as long as the profiles have elongated sufficiently.

Typical characteristics of the apparatus 1000 of FIG. 18 are that the zipper is typically always in a straight line so that tension typically does not create forces over the roller to deform the profiles; lower durometer nip rollers are used to eliminate deformation (a belt puller could be substituted); cooling, typically by cold air or water, should be applied to the flanges immediately after heating to stop the flanges from elongating (profiles typically should remain heated); tension typically should be maintained in the zipper, thereby allowing the profile sections to elongate, after the webs have stopped elongating; and the zipper typically should be unjoined to allow faster heat transfer to the profiles. It is further noted that, in order to maintain the contact area and the proper functioning of the zipper, the design of the zipper profiles should be altered so that the dimensions of the profile are the same after stretching as a similar zipper that is not designed for stretching. It is noted that some embodiments may stretch only one zipper profile or that one zipper profile may be stretched more than the other. FIGS. 19A and 19B illustrate the cross-sectional profile proportions before and after stretching the male profile 120 while FIGS. 20A and 20B illustrate the cross-sectional proportions before and after stretching the female profile 102. FIGS. 19A, 19B, 20A and 20B illustrate the reduction in cross section which may be expected from stretching the profiles 102, 120, but are not necessarily intended to be to scale.

Figure 21:
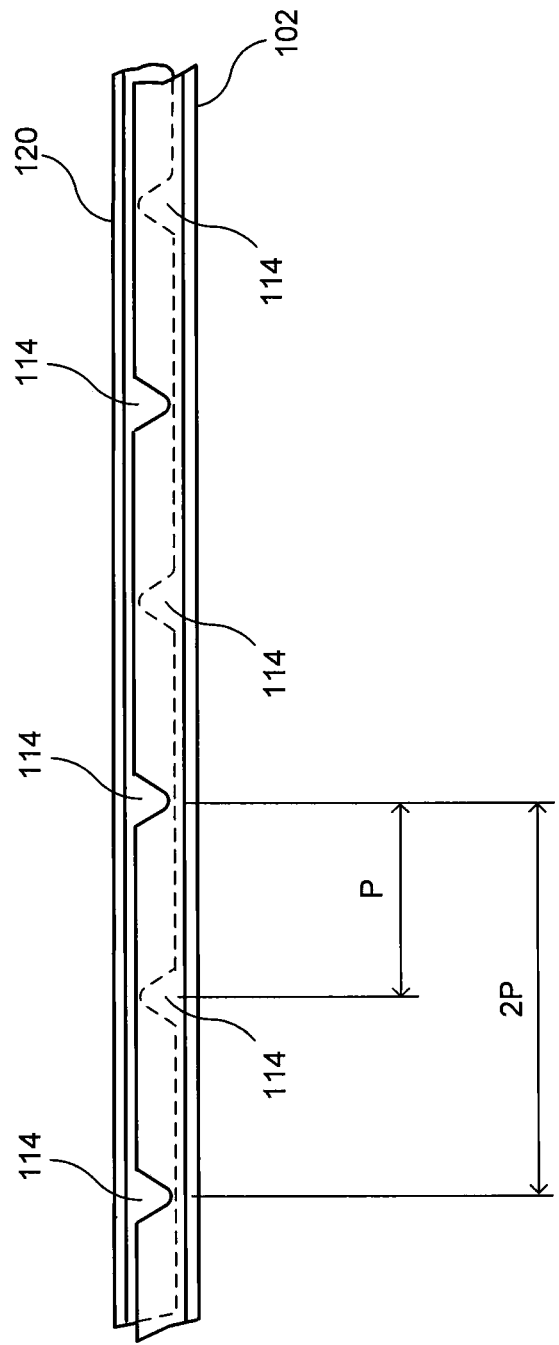
FIG. 21 is a side plan view, partially in cross section, showing the joining of the male and female zipper profiles, so as to offset the partial cuts or gaps.

As shown in FIG. 21, the rejoining of the zipper profiles 102, 120 (such as is done by zipper joining core 1010 of FIG. 18) may be configured so as to alternate the partial cuts or stretched gaps 114 in female profile 102 with those of male profile 120, so that the partial cuts or stretched gaps 114 of one profile are centered upon the uncut portion of the other profile. This configuration has been found typically to transmit the tactile vibrations, during and closing, more effectively to both sides of the package, and to more effectively maintain opening force performance than configurations wherein the partial cuts or gaps 114 of both zipper profiles are aligned with each other.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A zipper for a reclosable package including:
   a first interlocking zipper profile including a first base and at least one first interlocking element;
   a second interlocking zipper profile including a second base and at least one second interlocking element;
   wherein the at least one first interlocking element includes a series of partial gaps, the partial gaps being formed by creating a series of partial cuts and stretching and elongating the first interlocking zipper profile thereby stretching and elongating the first interlocking zipper profile around the series of partial cuts thereby transforming the series of partial cuts into the series of partial gaps;
   wherein a depth of the partial cuts is at least ten percent of the height of the first interlocking zipper profile and does not exceed eighty percent of the height of the first interlocking zipper profile; and operation of the zipper causing interaction between the at least one first interlocking element and the at least one second interlocking element thereby generating audible and tactile feedback.

2. The zipper of claim 1 wherein the depth of the partial cuts does not exceed sixty percent of the height of the first interlocking zipper profile.

3. The zipper of claim 2 wherein the first and second interlocking zipper profiles are formed of polymeric material.

4. The zipper of claim 3 wherein the at least one first interlocking element includes a female interlocking element comprising first and second arms terminating in respective first and second detent hooks, and wherein the at least one second interlocking element includes a male interlocking element that is received by the female interlocking element and interlocked thereto.

5. The zipper of claim 4 wherein the male interlocking element includes a post element terminating in an arrowhead shaped detent element.

6. The zipper of claim 3 wherein the partial cuts are formed transverse to a longitudinal axis of the first zipper profile.

7. The zipper of claim 3 wherein the partial cuts are formed diagonally with respect to a longitudinal axis of the first zipper profile.

8. The zipper of claim 3 wherein the first interlocking zipper profile includes a first female interlocking element and a second female interlocking element and wherein the second interlocking zipper profile includes a first male interlocking element and a second male interlocking element, for engaging with the respective first and second female interlocking elements.

9. The zipper of claim 8 wherein the partial cuts are formed in the first female interlocking element and wherein the second female interlocking element is free of the partial cuts.

10. The zipper of claim 9 wherein the partial gaps have a width of 0.0030 to 0.180 inches.

11. The zipper of claim 8 wherein the partial cuts are formed in the first and second female interlocking elements.

12. The zipper of claim 11 wherein the partial cuts formed in the first female interlocking element is longitudinally offset from the partial cuts formed in the second female interlocking element.

13. The zipper of claim 12 wherein offsetting of the partial cuts is used to provide a non-linear path for escape of heat therethrough.

14. The zipper of claim 3 wherein the at least one second interlocking element includes partial cuts.

15. The zipper of claim 14 wherein the partial cuts of the first interlocking element are longitudinally offset from the partial cuts of the second interlocking element.

16. The zipper of claim 2 wherein the first and second interlocking zipper profiles are formed from a material chosen from the group consisting of high density polyethylene, medium density polyethylene, low density polyethylene, linear low density polyethylene, polypropylene, cyclic olefin copolymers, ultralow density polyethylene, very low density polyethylene, elastomers, plastomers, metallocene linear low density polyethylene, metallocene polypropylene, and mixtures thereof.

17. The zipper of claim 2 wherein the first and second interlocking zipper profiles are multiple alignment profiles.

18. The zipper of claim 17 wherein the multiple alignment profiles include a plurality of parallel engaging elements and wherein the partial cuts are formed in the plurality of parallel engaging elements.

19. The zipper of claim 16 wherein the partial cuts are formed diagonally to a longitudinal axis of the zipper.

20. The zipper of claim 2 wherein the partial cuts are formed at an angle other than ninety degrees to a longitudinal axis of the zipper.

21. The zipper of claim 2 wherein the first and second interlocking zipper profiles are male profiles.

22. The zipper of claim 2 wherein at least one of the first and second interlocking zipper profiles has a detent element.

23. The zipper of claim 2 wherein at least one of the first and second interlocking zipper profiles includes two interlocking elements with a section between the two interlocking elements, and wherein the section is cut and stretched.

24. The zipper of claim 2 wherein the partial gaps have a width of 0.030 to 0.090 inches.

25. The zipper of claim 1 wherein the stretching of the zipper profile increases the length of the zipper, prior to subsequent elastic retraction, from ten to forty percent of the length of the zipper profile prior to the stretching of the zipper profile.

26. The zipper of claim 1 wherein the first interlocking zipper profile includes a first female interlocking element and a second female interlocking element, wherein the second interlocking zipper profile includes a first male interlocking element and a second male interlocking element, for engaging with the respective first and second female interlocking elements and wherein the partial cuts are formed in the first female interlocking element and wherein the second female interlocking element is free of the partial cuts.

27. The zipper of claim 1 wherein the partial cuts in the at least one first interlocking element do not extend into the first base.

* * * * *